US009135460B2

(12) United States Patent
Birch et al.

(10) Patent No.: US 9,135,460 B2
(45) Date of Patent: Sep. 15, 2015

(54) TECHNIQUES TO STORE SECRET INFORMATION FOR GLOBAL DATA CENTERS

(75) Inventors: Jonathan Birch, Redmond, WA (US); Amit Date, Redmond, WA (US); Daniel Jump, Redmond, WA (US); Vikas Malhotra, Kirkland, WA (US); Bradley Albrecht, Snohomish, WA (US); Ali Deniz Demircioglu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 212 days.

(21) Appl. No.: 13/334,360

(22) Filed: Dec. 22, 2011

(65) Prior Publication Data

US 2013/0167200 A1    Jun. 27, 2013

(51) Int. Cl.
*G06F 7/04*      (2006.01)
*H04L 29/06*    (2006.01)
*G06F 21/62*    (2013.01)

(52) U.S. Cl.
CPC ............ *G06F 21/6209* (2013.01); *H04L 63/08* (2013.01)

(58) Field of Classification Search
CPC .. G06F 21/6209; G06F 21/6218; H04L 63/08
USPC ............... 726/1-4, 7, 27, 29; 715/735; 718/1; 713/152, 155; 709/229, 220
See application file for complete search history.

(56) References Cited

U.S. PATENT DOCUMENTS

| | | | | |
|---|---|---|---|---|
| 5,745,573 | A * | 4/1998 | Lipner et al. | 380/286 |
| 6,460,036 | B1 * | 10/2002 | Herz | 707/748 |
| 6,823,391 | B1 * | 11/2004 | Deen et al. | 709/229 |
| 7,437,756 | B2 * | 10/2008 | Bleumer | 726/6 |
| 7,496,645 | B2 | 2/2009 | Yeung et al. | |
| 7,565,537 | B2 | 7/2009 | Morais et al. | |
| 8,151,319 | B2 * | 4/2012 | Dhand et al. | 726/3 |
| 8,352,941 | B1 * | 1/2013 | Protopopov et al. | 718/1 |
| 8,401,186 | B2 * | 3/2013 | Liu | 380/46 |
| 8,407,477 | B2 * | 3/2013 | Ogawa | 713/176 |
| 8,473,615 | B1 * | 6/2013 | Rowland et al. | 709/226 |
| 8,824,674 | B2 * | 9/2014 | Ogawa | 380/44 |
| 8,837,734 | B2 * | 9/2014 | McCallum et al. | 380/277 |
| 8,948,381 | B2 * | 2/2015 | Song | 380/44 |

(Continued)

FOREIGN PATENT DOCUMENTS

KR    10-2011-0072239 A    6/2011

OTHER PUBLICATIONS

"Nomad Secure Access Architecture", Retrieved at <<http://www.nomadsecurity.com/NSA-architecture.html>>, Retrieved Date: Aug. 10, 2011, pp. 6.

(Continued)

*Primary Examiner* — Abu Sholeman
(74) *Attorney, Agent, or Firm* — Thomas Wong; Sade Fashokun; Micky Minhas

(57) ABSTRACT

Techniques to store secret information for global data centers securely may provide a front end service for a back end data store. The front end service may be responsible for deployment, upgrade, and disaster recovery aspects, and so forth, of data center maintenance. Data centers may access data and data-related services from the back end data store through the front end service. Secrets that are needed to access secure data may be stored on behalf of the data centers without providing the secrets to the data centers.

20 Claims, 8 Drawing Sheets

(56) References Cited

U.S. PATENT DOCUMENTS

| | | | | |
|---|---|---|---|---|
| 2002/0188458 A1* | 12/2002 | Babbrah | | 705/1 |
| 2003/0140131 A1* | 7/2003 | Chandrashekhar et al. | | 709/223 |
| 2004/0024709 A1* | 2/2004 | Yu et al. | | 705/43 |
| 2004/0034670 A1* | 2/2004 | Bhuyan | | 707/204 |
| 2004/0133797 A1* | 7/2004 | Arnold | | 713/200 |
| 2006/0259970 A1* | 11/2006 | Sheymov et al. | | 726/23 |
| 2007/0005965 A1* | 1/2007 | Nalliah et al. | | 713/168 |
| 2008/0021866 A1 | 1/2008 | Hinton et al. | | |
| 2008/0120698 A1 | 5/2008 | Ramia | | |
| 2008/0301794 A1 | 12/2008 | Lee | | |
| 2008/0310421 A1* | 12/2008 | Teisberg et al. | | 370/395.53 |
| 2009/0064287 A1 | 3/2009 | Bagepalli et al. | | |
| 2010/0005156 A1* | 1/2010 | Wesby | | 709/219 |
| 2010/0023859 A1* | 1/2010 | Dawson et al. | | 715/706 |
| 2010/0077208 A1 | 3/2010 | Appiah et al. | | |
| 2010/0077467 A1* | 3/2010 | Satagopan et al. | | 726/7 |
| 2010/0107241 A1 | 4/2010 | Jaber et al. | | |
| 2010/0145882 A1 | 6/2010 | Wronski et al. | | |
| 2010/0169497 A1* | 7/2010 | Klimentiev et al. | | 709/228 |
| 2010/0211781 A1* | 8/2010 | Auradkar et al. | | 713/168 |
| 2010/0211782 A1* | 8/2010 | Auradkar et al. | | 713/168 |
| 2010/0318604 A1* | 12/2010 | Stafie et al. | | 709/203 |
| 2010/0318782 A1* | 12/2010 | Auradkar et al. | | 713/150 |
| 2010/0318812 A1* | 12/2010 | Auradkar et al. | | 713/193 |
| 2010/0333178 A1* | 12/2010 | Suthoff | | 726/4 |
| 2011/0083003 A1* | 4/2011 | Jaber et al. | | 713/2 |
| 2011/0107133 A1* | 5/2011 | Carter et al. | | 713/600 |
| 2011/0145580 A1* | 6/2011 | Auradkar et al. | | 713/170 |
| 2011/0184993 A1* | 7/2011 | Chawla et al. | | 707/802 |
| 2011/0185292 A1* | 7/2011 | Chawla et al. | | 715/760 |
| 2011/0185355 A1* | 7/2011 | Chawla et al. | | 718/1 |
| 2011/0208611 A1* | 8/2011 | Campbell et al. | | 705/26.25 |
| 2011/0270968 A1* | 11/2011 | Salsburg et al. | | 709/224 |
| 2011/0282975 A1* | 11/2011 | Carter | | 709/220 |
| 2011/0283017 A1* | 11/2011 | Alkhatib et al. | | 709/244 |
| 2011/0302415 A1* | 12/2011 | Ahmad et al. | | 713/168 |
| 2012/0022914 A1* | 1/2012 | Thomas et al. | | 705/7.29 |
| 2012/0054624 A1* | 3/2012 | Owens et al. | | 715/735 |
| 2012/0066510 A1* | 3/2012 | Weinman | | 713/189 |
| 2012/0069131 A1* | 3/2012 | Abelow | | 348/14.01 |
| 2012/0116918 A1* | 5/2012 | Andersson | | 705/26.41 |
| 2012/0134494 A1* | 5/2012 | Liu | | 380/44 |
| 2012/0134495 A1* | 5/2012 | Liu | | 380/46 |
| 2012/0137199 A1* | 5/2012 | Liu | | 714/801 |
| 2012/0167192 A1* | 6/2012 | Dhand et al. | | 726/7 |
| 2012/0198375 A1* | 8/2012 | Carter et al. | | 715/771 |
| 2012/0203800 A1* | 8/2012 | Wu et al. | | 707/784 |
| 2012/0222106 A1* | 8/2012 | Kuehl | | 726/11 |
| 2012/0284527 A1* | 11/2012 | Nagpal et al. | | 713/189 |
| 2012/0297201 A1* | 11/2012 | Matsuda et al. | | 713/189 |
| 2013/0064365 A1* | 3/2013 | Song | | 380/44 |
| 2013/0080703 A1* | 3/2013 | Kumagai et al. | | 711/117 |
| 2013/0117810 A1* | 5/2013 | Cheenath et al. | | 726/1 |
| 2013/0124860 A1* | 5/2013 | Maidl et al. | | 713/164 |
| 2013/0152088 A1* | 6/2013 | Gkantsidis et al. | | 718/100 |
| 2013/0339301 A1* | 12/2013 | Saito et al. | | 707/649 |
| 2013/0346123 A1* | 12/2013 | Pelissier et al. | | 705/5 |
| 2014/0019446 A1* | 1/2014 | He et al. | | 707/725 |
| 2014/0032920 A1* | 1/2014 | Gehrmann et al. | | 713/176 |
| 2014/0082749 A1* | 3/2014 | Holland et al. | | 726/29 |
| 2014/0164768 A1* | 6/2014 | Kruglick | | 713/168 |
| 2014/0223576 A1* | 8/2014 | Zhao | | 726/27 |
| 2014/0258155 A1* | 9/2014 | Suryanarayanan et al. | | 705/318 |
| 2014/0282824 A1* | 9/2014 | Lango et al. | | 726/1 |

OTHER PUBLICATIONS

"International Search Report", Mailed Date: Mar. 25, 2013, Application No. PCT/US2012/069031, Filed date: Dec. 12, 2012, pp. 11.

* cited by examiner

500

- GENERATE A SECRET FOR A DATA CENTER AT A FRONT END SERVICE
  502

- RECEIVE A REQUEST AT THE FRONT END SERVICE TO ACCESS THE BACK END STORAGE FROM A CLIENT IN THE DATA CENTER
  504

- ACCESS THE BACK END STORAGE FROM THE FRONT END SERVICE USING THE SECRET GENERATED FOR THE DATA CENTER
  506

- RETURN THE RESULT OF ACCESSING THE BACK END STORAGE TO THE CLIENT
  508

*FIG. 5*

TECHNIQUES TO STORE SECRET INFORMATION FOR GLOBAL DATA CENTERS

BACKGROUND

For large data centers, it may be difficult to manage secret-related information, such as passwords and certificates. The secret-related information may be used by client machines to access data and services from a data service. Storing the secrets used to access the data and services in multiple locations may make the data vulnerable to unauthorized access. Updating or expanding the data center may result in exponential growth of the number of secrets needed. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to store secret information for global data centers. Some embodiments are particularly directed to techniques to store secret information centrally and securely. In one embodiment, for example, a technique may comprise generating a secret for a data center from a front end service. The front end service may receive a request from a client in the data center to access a back end storage. The technique may further comprise accessing the back end storage from the front end service using the secret generated for the data center; and returning the result of accessing the back end storage to the client. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5 illustrates an embodiment of a logic flow.

DETAILED DESCRIPTION

Conventional data center and data service deployments may store secret information as a file at each machine in a data center. The secrets may be hard-coded into the file. The files may be managed manually. Such scenarios may cause data center operators to limit the number of secrets provided to the data centers. If the secrets were stolen or mis-used from any one machine, the entire set of data at the data service could be compromised. Further, such an implementation makes extending the data center, upgrading the data center, and/or recovering from a disaster at the data center, tedious, time consuming, and error prone, as every machine had to have its secret information dealt with.

Various embodiments are directed to techniques to store data securely for global data centers. Various embodiments may provide a front end service for a back end data store. The front end service may be responsible for deployment, upgrade, and disaster recovery aspects, and so forth, of data center maintenance. Data centers may access data and data-related services from the back end data store through the front end service. Secrets, e.g. passwords and certificates, that are needed to access secure data, may be stored on behalf of the data centers without providing the secrets to the data centers. As a result, the embodiments can improve scalability, modularity, extendibility, and security for a data center system and network.

Figure 1:
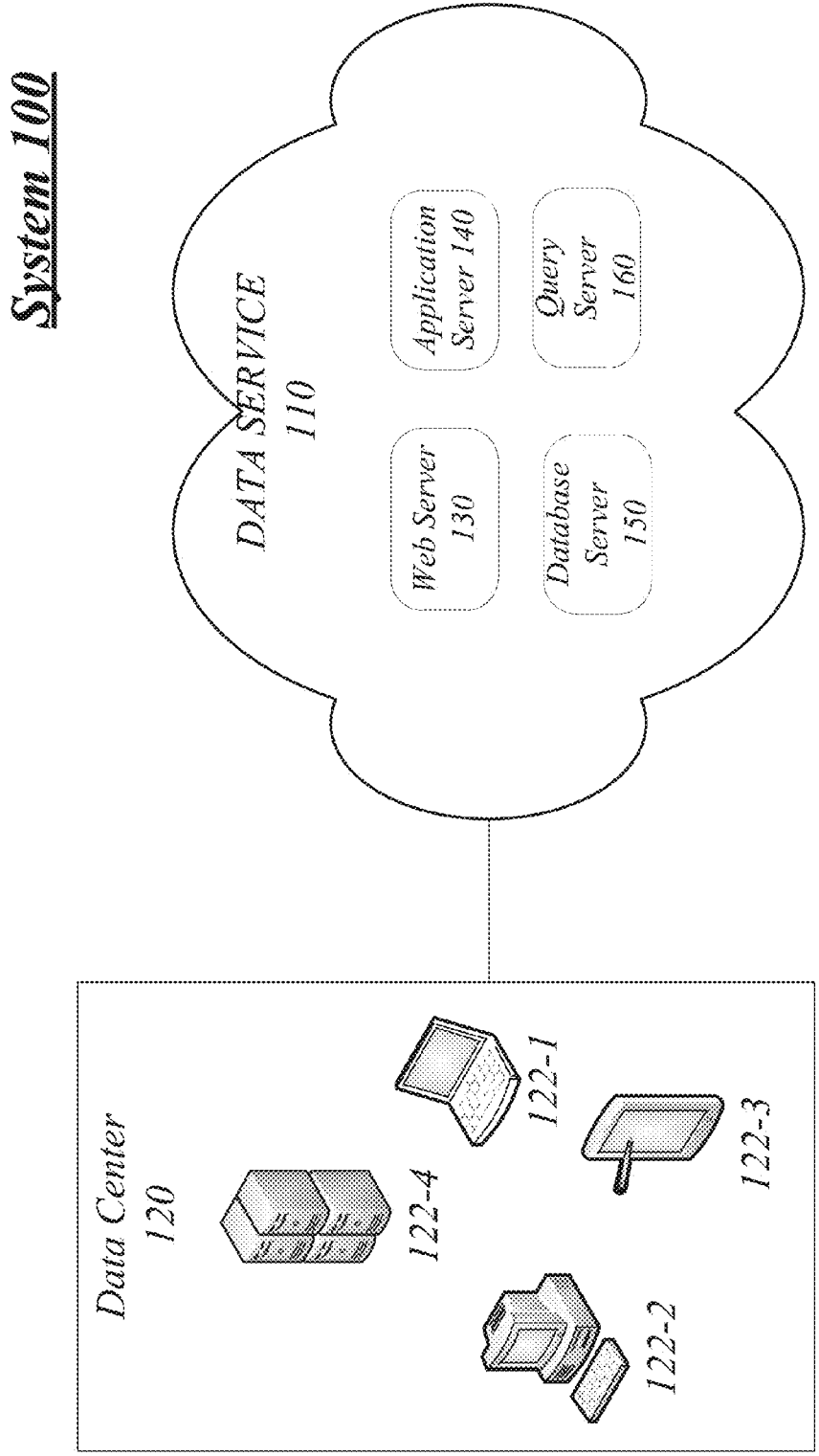
FIG. 1 illustrates an embodiment of a first system for providing data services.

FIG. 1 illustrates a block diagram for a system 100 to provide data services to a data center. In one embodiment, for example, the system 100 may comprise a computer-implemented system 100 having multiple components, such as data service 110 and data center 120. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The data service 110 and data center 120 may be communicatively coupled via various types of communications media. The data service 110 and data center 120 may coordinate operations between each other. The coordination may involve the uni-directional or bi-directional exchange of information. For instance, the data service 110 and data center 120 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may comprise data service 110. Data service 110 may be implemented with a cloud computing model. In a cloud computing model, applications and services may be provided as though the applications and data were on a local device, without having to install the applications and/or store the data on a local computer. However, the applications and/or data storage may be implemented across many devices, servers, and data stores, accessible over a communication interface from a local device. In a cloud computing model, data service 110 may be physically embodied on one or more servers, and in one or more physical locations. Regardless of physical configuration, data service 110 may appear, logically, as one device or system to external entities, such as data center 120. Data service 110 may distribute portions of its structure and/or operations across multiple computing entities. Examples of data service 110 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

Data service 110 may store data and provide data-related services for data center 120 remotely from data center 120. An example of a data service may include, for example but not limited to, MICROSOFT SHAREPOINT® ONLINE. Data service 110 may be owned by an entity different from an entity that owns data center 120. Data service 110 may be operated on behalf of data center 120 to store data and provide secure access to the data, among other services.

In an embodiment, data service 110 may be comprised of one or more servers that provide one or more functions. For example, data service 110 may include one or more web servers 130 that host any web pages and web services that data service 110 provides. Data service 110 may include one or more application servers 140 that host any service applications that data service 110 provides. Data service 110 may include one or more database servers 150 that store some or all of the data associated with data service 110, including, for example, configuration settings, administration information, data associated with applications, and user-generated data. Data service 110 may include a query server 160 that queries data in data service 110 and returns matching results, for example, to web server 130 for presentation. The embodiments are not limited to these examples.

Data service 110 may store data in any format that is used by a data center, such as data center 120. The data may be in the form of, for example but not limited to, word processing documents, spreadsheet documents, presentation documents, databases, multimedia files, Internet browser-readable documents, enterprise management data, and so forth. The data may be formatted according to an application that data service 110 may provide to data center 120. The embodiments are not limited to these examples.

In various embodiments, the system 100 may comprise a data center 120. Data center 120 may be embodied in one or more physical locations. Data center 120 may include one or more electronic devices 122 in communication with data service 110. For example, data center 120 may include one or more laptop computers 122-1, one or more desktop computers 122-2, one or more tablet computers 122-3, and one or more servers 122-4. Additional electronic devices and/or alternate electronic devices may be used in data center 120. In an embodiment, devices 122-1, 122-2, and 122-3 may connect to data service 110 via server 122-4, which may connect to data service 110 via wired or wireless communication, to view data on data service 110, modify data on data service 110, query data on data service 110, use an application executed by data service 110, and so forth.

Figure 2:
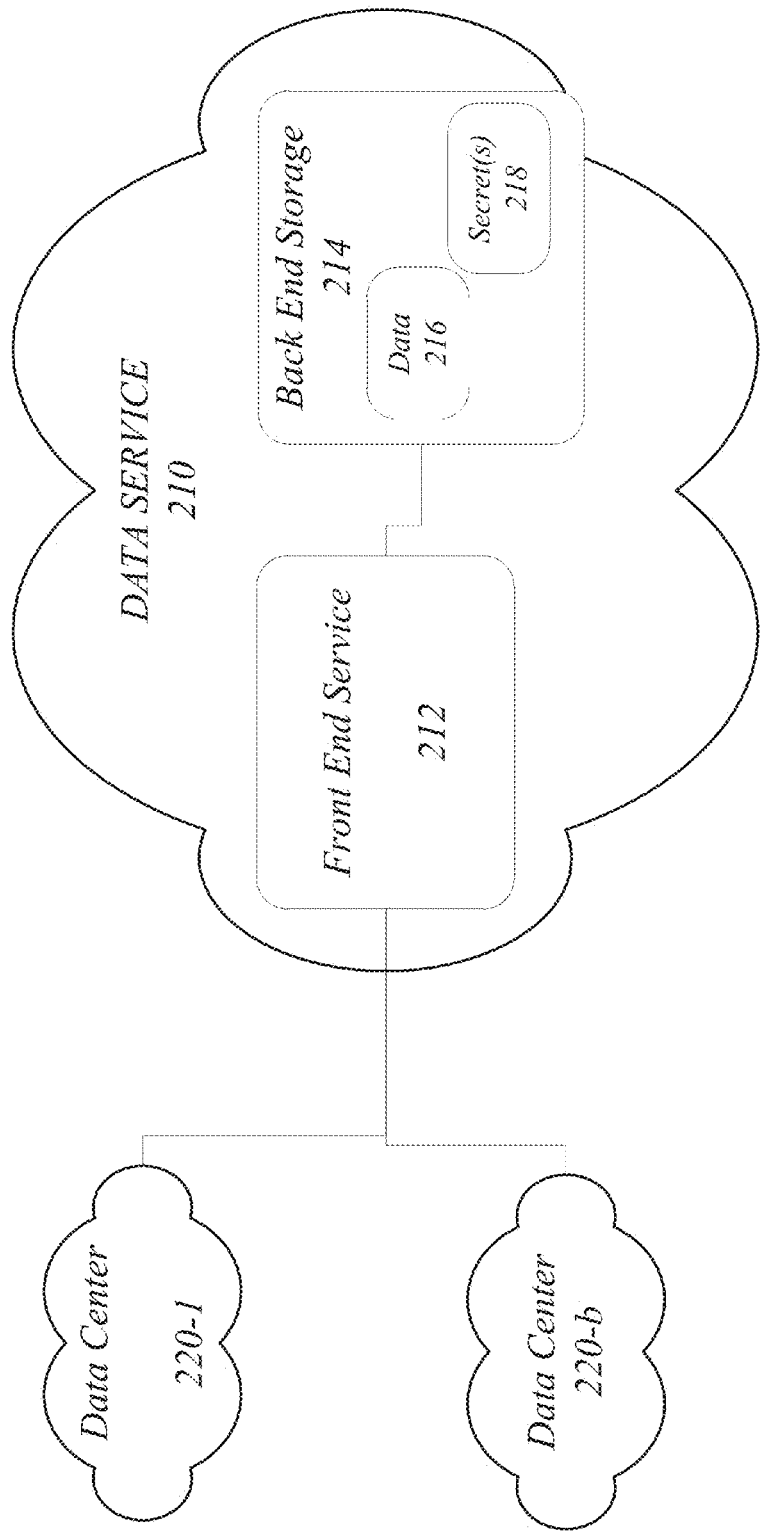
FIG. 2 illustrates an embodiment of a second system for storing secret information for data services.

FIG. 2 illustrates a block diagram of a system 200 to provide secure data services to a data center. The system 200 may be similar to the system 100, and may further comprise a front end service 212 and a back end storage 214. In system 200, data service 210 and data center 220 may represent data center 120 and data service 110, respectively.

System 200 may include a plurality of data centers, represented by data centers 220-1 and 220-b, where b represents a positive integer. The plurality of data centers 220 may be different data centers operated by one entity. The different data centers 220 may be in different physical locations but may access the same data at data service 210.

The different data centers 220 may be operated by one entity but access different sets of data at data service 210. One of the different data centers may be prevented from accessing a data set that another data center may have access to. For example, one entity may store its employee information and its engineering project files at data service 210. The engineers accessing the data at data service 210 may be prevented from accessing the employee information, even though the data collectively belongs to the one entity.

In another embodiment, the different data centers 220 may be owned by different entities. The different data centers 220 may need to be prevented from accessing another entity's data at data service 210.

In various embodiments, data service 210 may include front end service 212 and back end storage 214. Front end service 212 may be responsible for aspects of maintaining any data centers in communication with it with regard to, for example, deployment, upgrade, and disaster recovery. In an embodiment, front end service 212 may be the only process that can access back end storage 214. Front end service 212 may audit and/or monitor each access attempt to back end storage 214. Front end service 212 may understand all authorized interactions between front end service 212 and back end storage 214 such that, if an interaction that is unexpected occurs, an incident may be triggered and the unauthorized event can get immediate attention.

When an electronic device 122 in a data center 220 makes a request to front end service 212 that includes the use of a secret, front end service 212 may validate the request before processing it. As such, front end service 212 may be responsible for acting as a trust boundary. If that trust boundary is compromised, then the data center secrets can be assumed to be also compromised. Front end service 212 is described in additional detail with respect to FIG. 4.

In various embodiments, data service 210 may include back end storage 214. Back end storage 214 may include all of the data 216 that data service 210 is used to store, e.g. the entity and application related documents, databases and so forth that electronic devices 122 at a data center 220 interact with. In addition to data service data 216, back end storage 214 may also store secrets 218. Back end storage 214 may not be directly accessible to a data center 220. For example, data center 220 may not be able to "see" back end storage 214 on a network. Back end storage 214 may block any attempt to access it by any device or entity other than front end service 212.

Secrets 218 may include any secret information that may be used to access data 216, without which data 216 cannot be accessed, and that could be used for harm if a malicious entity were to obtain it. Secrets 218 may be related to the data center/data service relationship, and may exclude end user account secrets, e.g. the user name and password that a specific person would use to access an individual electronic device or to access data specific to that person. Examples of secrets 218 may include, without limitation, user identifiers, passwords, private keys, digital certificates from a certificate authority, biometric information, radio frequency identifications, and so forth. In an embodiment, secrets 218 may be generated by front end service 212 when a data center 220 is provisioned. Secrets 218 may not be provided to a data center 220 in order to prevent the existence of multiple copies of secrets 218 and the unauthorized dissemination of secrets 218. Having just one copy of secrets 218 in one location (back send storage 214) may also improve extensibility and scalability, since secrets 218 need only be updated at one location, and not at each electronic device 122 in a data center 220.

In an embodiment, back end storage 214 may only be accessed from front end service 212 programmatically. With the exception of key operational staff, login access to back end storage 214 may not be permitted. In an embodiment, back end storage 214 may encrypt secrets 218 both at runtime and at rest. Encrypting at rest may ensure that compliance standards are met. For example, if a backup of the disk on which back end storage 214 resides were stolen, or if someone were to look at back end storage 214 at runtime, encryption, without explicit knowledge of how to reverse the encryption, may prevent secrets 218 from disclosure.

Figure 3:
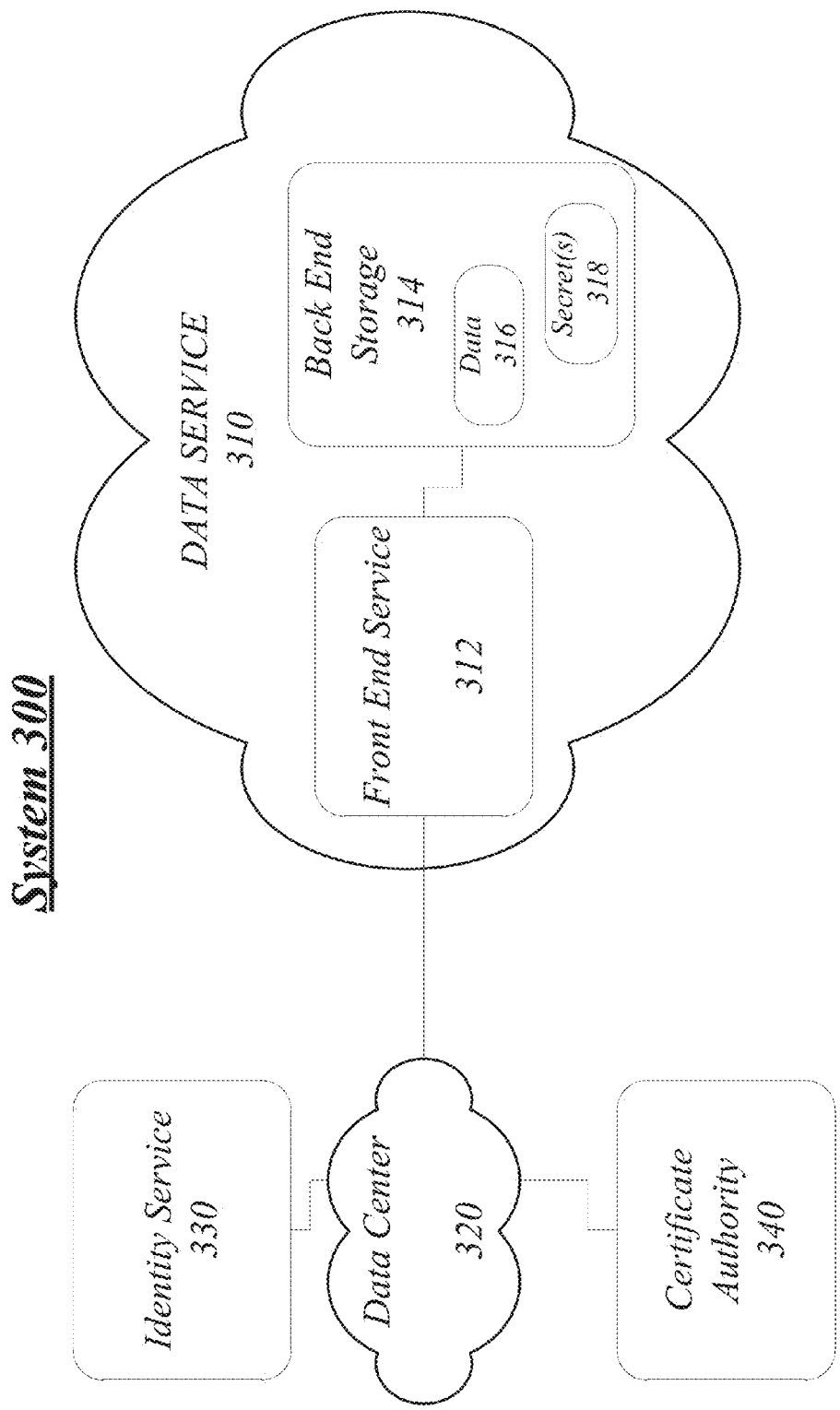
FIG. 3 illustrates an embodiment of a third system for storing secret information for data services.

FIG. 3 illustrates a block diagram of a system 300. The system 300 may be similar to the system 200, and may further comprise an identity service 330 and a certificate authority 340. In system 300, data service 310 and data center 320 may represent data center 220 and data service 210, respectively.

Identity service 330 may comprise a network device that publishes a public directory of operators and/or network resources. Identity service 330 may be a component of data center 320, or may be separate from data center 320 while being in communication with data center 320. In one embodiment, for example and without limitation, identity service 330 may be implemented as a MICROSOFT ACTIVE DIRECTORY®. Identity service 330 may be an implementation of lightweight directory access protocol (LDAP) directory services to provide central authentication and authorization services for network computers, e.g. for electronic devices 122. Identity service 330 may also allow administrators to assign policies, deploy software, and apply updates to an organization. Identity service 330 may store information and settings in a central database. Data centers 320 supported by identity service 330 can vary from a small installation with a few hundred objects, to a large installation with millions of objects.

Generally, electronic devices 122 and data center 320 may not be trusted by front end service 312. In an embodiment, front end service 312 may access data center 320's identity service 330. Accessing identity service 330 may allow front end service 312 to authenticate the "identity" of the data center 320 from which a request for data is coming. Identity service 330 may authenticate the individual accessing an electronic device 122 in data center 320. Identity service 330 may also include may include what access privileges the individual has, or what access privileges data center 320 as a whole has. Front end service 312 may use the authentication services from identity service 320 and information about access privileges to determine whether and how to process a request for data from back end storage 314.

Certificate authority 340 may comprise a device or entity that issues digital certificates. A digital certificate may certify the ownership of a public key by the named subject of a certificate. The public key may be paired with a private key, which may be used to encrypt and decrypt data exchanged with another entity. In an embodiment, when data center 320 holds a pair of public and private keys, the private key may be stored in secrets 318. A certificate may also be stored in secrets 318. In an embodiment, front end service 312 may interact with the certificate authority 340 to request new certificates and store the private keys associated with those certificates in secrets 318.

Figure 4:
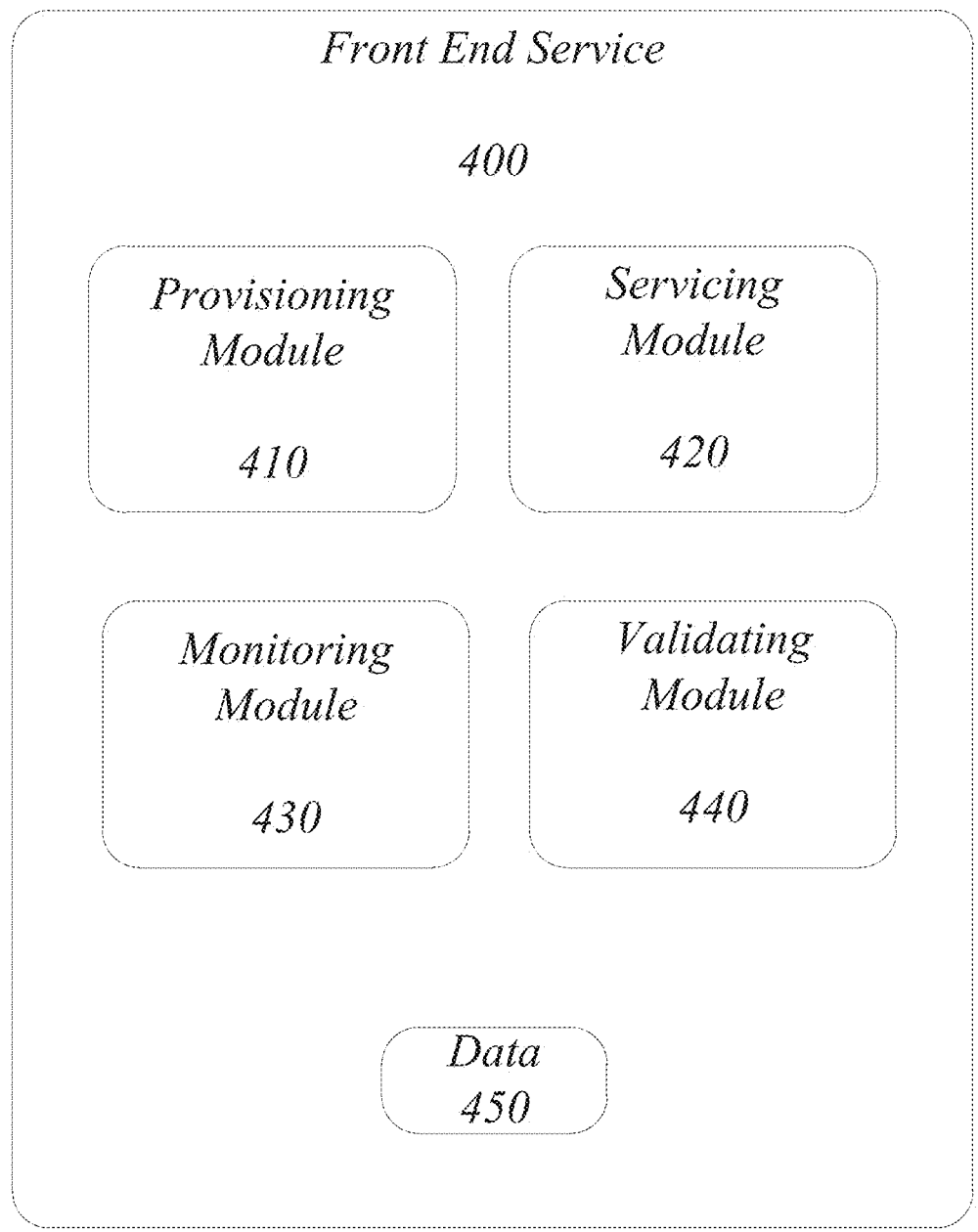
FIG. 4 illustrates an embodiment of a front end service.

FIG. 4 illustrates a block diagram of a front end service 400. Front end service 400 may be a representative embodiment of front end service 212 or 312. Front end service 400 may include one or more functional components, such as a provisioning module 410, a servicing module 420, a monitoring module 430, and a validating module 440. Front end service 400 may further include data 450.

Provisioning module 410 may be used to generate and deploy a new data center 120. Provisioning module 410 may create farms. A farm may refer to the server or servers that represent data service 310 for a data center 320. A data center 320 may be comprised of more than one farm.

Provisioning module 410 may create roles. A role may include a set of permissions and/or access levels that may be assigned to an account. An account may be specific to an individual user, or to a group of users. For example, some roles may allow reading of certain types of documents, but not modification. Other roles may allow reading and modification of documents. Still others may allow modifications to accounts or other administrative tasks. The embodiments are not limited to these examples. Each role may have one or a set of secrets associated with it, or may use the secrets of the farm to which the role is assigned. Each farm may have one or more secrets for its use.

Provisioning module 410 may automatically generate new secrets for a new data center or farm, or whenever new secrets are needed for an existing data center or farm, for example, during an upgrade deployment or when a new role is created. Provisioning module 410 may generate, for example, account information, e.g. a user name and password, at runtime at any time. In an embodiment, an administrator or other personnel may manually enter secrets during deployment. Front end service 400 may be extensible in that, if new types of secrets are needed beyond what data service 210, 310 currently uses, those types and related tasks can be added and the front end service can perform those operations. In an embodiment, when a new "role" is deployed, a new set of secrets may be applied. In an embodiment, when a new role is deployed, all old accounts, for example, in identity service 330 for the farm, may be disabled.

Servicing module 420 may receive requests for data and/or services from a data center, e.g. data center 220. Servicing module 420 may receive requests from web server 130, for example. Servicing module 420 may process and fulfill the requests. In an embodiment, servicing module 420 may call on application server 140 and/or query server 150 to fulfill a request.

In an embodiment, when a secret is needed to fulfill a request, front end service 400 may make the request and provide only the secret requested to a given job. For example, if a particular farm needs to know a secret, then only the secret for that farm may be returned, not the secrets for all the farms in the data center. Additionally, not all the secrets for the specific farm may be returned, but only the specific secret requested. In an embodiment, secrets may only be passed to other processes via memory calls, not by writing a secret to disk outside of back end storage 314, since that would mean the secret could reside in places in the data center that are not secure.

In an embodiment, data centers or farms may not access secrets 318 directly at all. In such an embodiment, only front end service 400 may access a secret 318 programmatically. When a request is for data or for a job that is protected by a secret, front end service 400 may retrieve the relevant secret from secrets 318, and pass the request and the relevant secret to back end storage 314 and the appropriate server to process the request without ever providing the secret to the requesting farm or data center. In an embodiment, the request from servicing module 420 to back end storage 314 may include the secret. In an embodiment, the request may not contain the secret, and may prompt back end storage 314 to determine what secret is needed, and to request the secret from servicing module 420. The embodiments are not limited to these examples.

Monitoring module 430 may monitor and/or audit each access of back end storage 214, 314 by front end service 400. In an embodiment, monitoring module 430 may compare an interaction between front end service 400 and back end storage 314 to allowed interactions. When an interaction is not an allowed interaction, e.g. when a false secret is used to request data, or a request for a secret or secret-protected data does not come from front end service 400, monitoring module 430 may generate an incident, e.g. an exception, a flag, an error, and so forth. The incident may prompt an authorized person to inspect the unexpected interaction to determine an appropriate course of action. In an embodiment, monitoring module 430 may keep a record of all interactions between front end service 400 and back end storage 314. The records may be used to audit the interactions.

Validating module 440 may be used to authenticate a data center and/or farm that is requesting data and/or services. Validating module 440 may access identity service 330 for the requesting data center or farm. If the requesting data center or farm cannot be authenticated, the request may be denied. In an embodiment, a denied request may cause monitoring module 430 to generate an incident.

Validating module 440 may be used to validate a request. For example, if a request is for data that the requesting data center does not have access privileges for, the request may be invalid.

The modules of front end service 400 described herein may be configured in various combinations. For example, servicing module 420 may be combined with monitoring module 430, validating module 440, or both.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may generate a secret for a data center at a front end service at block 502. For example, front end service 212, 312, 400 and/or provisioning module 410 may create a password for a data center, farm, role, or other entity (collectively referred to as "data center" for the discussion of logic flow 500). The secret may allow the data center to access data on back end storage 214, 314 for which the data farm has access privileges. The secret may be in the form of one or more of a user name, password, digital certificate, public/private encryption key pair, and so forth. The secret may not be provided to data center, but may instead be stored on back end storage 214, 314. In an embodiment, the secret is not generated by a person and may not be associated with a particular individual.

The logic flow 500 may receive a request at the front end service to access the back end storage from a client in the data center at block 504. For example, front end service 212, 312, 400 and/or servicing module 420 may receive a request to access data, or a request to perform a job that needs to access data, that is on the back end storage 214, 316. The request may include, for example, a request to open a document, provision a new farm, edit a database, and so forth. In an embodiment, the request may not include the secret needed to access the data.

The logic flow 500 may access the back end storage from the front end service using the secret generated for the data center at block 506. For example, front end service 212, 312, 400 and/or servicing module 420 may determine what secret is assigned to, or associated with, the requesting data center. The secret may be retrieved from back end storage 214, 314 and used to make the request to back end storage 214, 314 according to the request. In an embodiment, front end service 212, 312, 400, servicing module 420, and/or validating module 440 may authenticate the data center making the request prior to servicing the request.

Accessing the back end storage 214, 314 may include decrypting the relevant secret to provide to a server in back end storage that will process the request. Accessing the back end storage 214, 314 may further include opening a document, processing data in a database, provisioning a new farm for a data center, and, generally, making use of the data and services provided by data service 210, 310 that include data on back end storage 214, 314.

The logic flow 500 may return the result of accessing the back end storage to the client at block 508. For example, front end service 212, 312, 400 and/or servicing module 420 may transmit a copy of a requested document, or may return the result of a calculation, a link to a document, or data related to provisioning a new farm.

Figure 6:
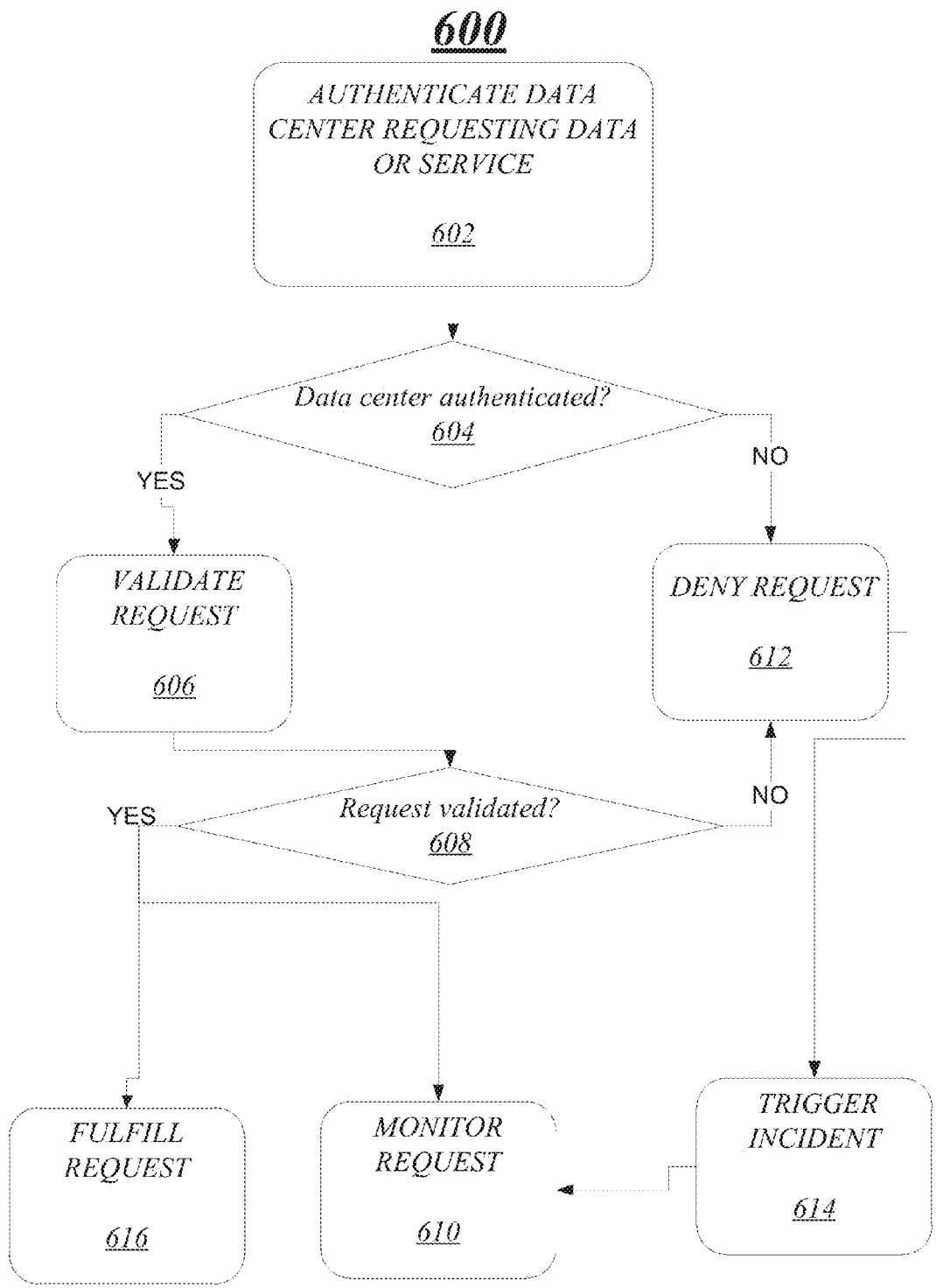
FIG. 6 illustrates an embodiment of a logic flow for authorizing a request.

FIG. 6 illustrates one embodiment of a logic flow 600. The logic flow 600 may be representative of some or all of the operations executed by one or more embodiments described herein. In particular, logic flow 600 may be representative of operations related to block 504 in logic flow 500.

In the illustrated embodiment shown in FIG. 6, the logic flow 600 may authenticate the data center, farm, role, or other entity (collectively referred to as "data center" for the discussion of logic flow 600) requesting data or a service in block 602. For example, validation module 440 and/or servicing module 410 may receive access credentials from a requesting data center, such as a login id and password. Front end service 212, 312, 400, e.g. with validation module 440 and/or servicing module 410, may access identity service 330 to authenticate the access credentials.

Logic flow 600 may determine whether the data center is authenticated in block 604. When the data center is not authenticated, logic flow 600 may deny the request in block 612. Otherwise, logic flow 600 may proceed to validate the request in block 606.

In block 606, front end service 212, 312, 400 may look up or otherwise access the secret that was generated for the requesting data center. Front end service 212, 312, 400 may retrieve the access privileges associated with the secret. Front end service 212, 312, 400 may determine whether the data and/or service requested is available to the requesting data center, according to the access privileges. If not, the request may not be validated. A request may not be valid for other reasons as well. Other examples of invalid requests may include an improperly formatted request, a request that contains unexpected data, a request for data that does not exist, and so forth. The embodiments are not limited to these examples.

Logic flow 600 may determine whether the request was valid at block 608. When the request is not valid, logic flow 600 may deny the request in block 612. Otherwise, logic flow 600 may fulfill the request in block 616, as described with respect to block 506 in logic flow 500.

When a request is denied in block 612, logic flow 600 may also trigger an incident event in block 614. For example, front end service 212, 312, 400 may throw an exception, generate a visual warning, generate an audio warning, send an instant message or e-mail message to an administrator, and so forth. The incident event may indicate the reason for the event, such as a failed authentication or an invalid request and may provide options for addressing the incident. In severe cases, such as when a hacking attempt is detected, an incident event may provide a way for an administrator to start a provisioning process to generate a new farm, role, data center and so forth with new secrets.

Logic flow 600 may monitor the request at block 610. In an embodiment, all requests may be monitored, whether denied (at block 612) or fulfilled (at block 616). The monitoring may include recording information about each request, such as what made the request, what was requested, whether the request was successful, and so forth.

Figure 7:
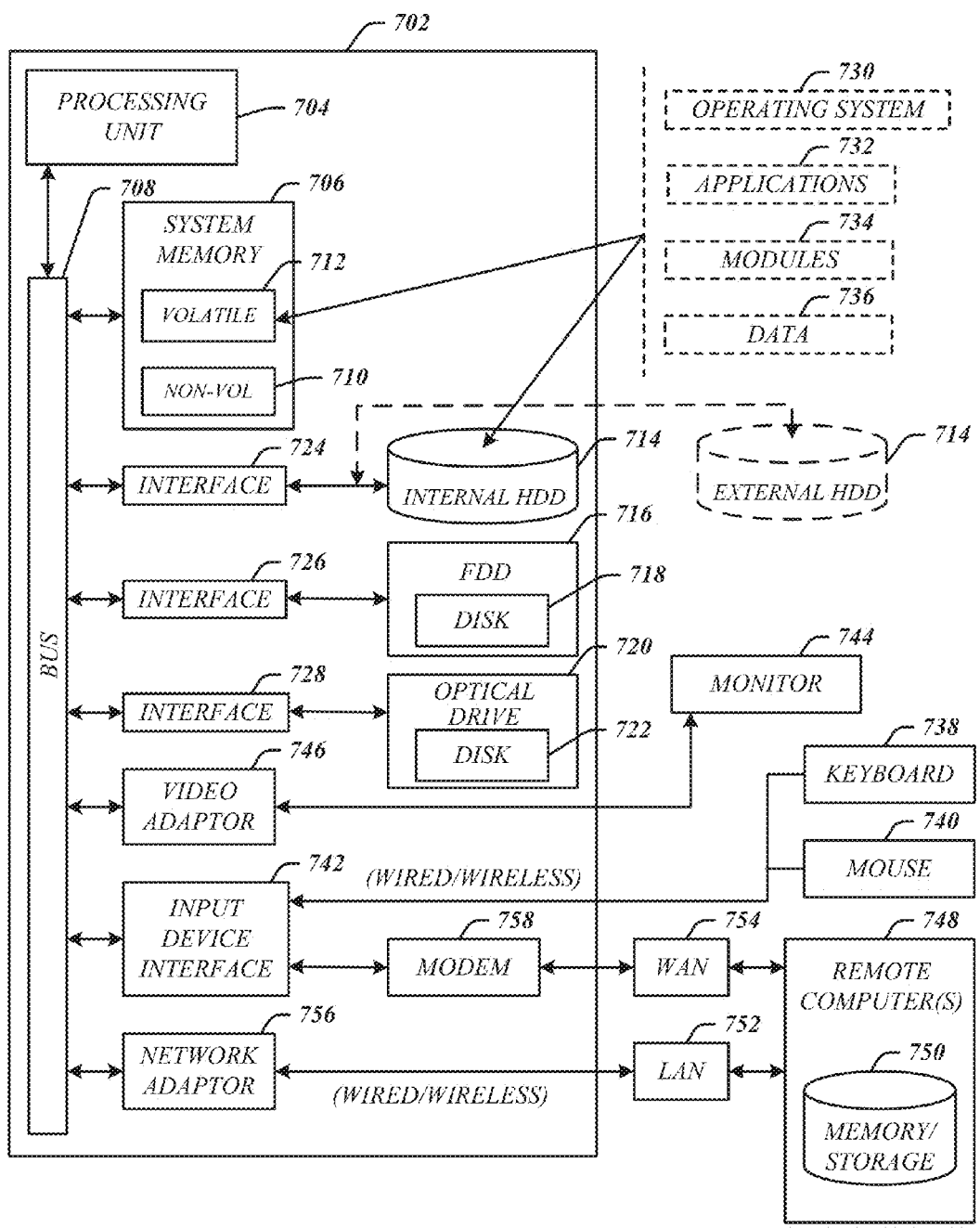
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the provisioning module 410, servicing module 420, monitoring module 430 and validating module 440.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
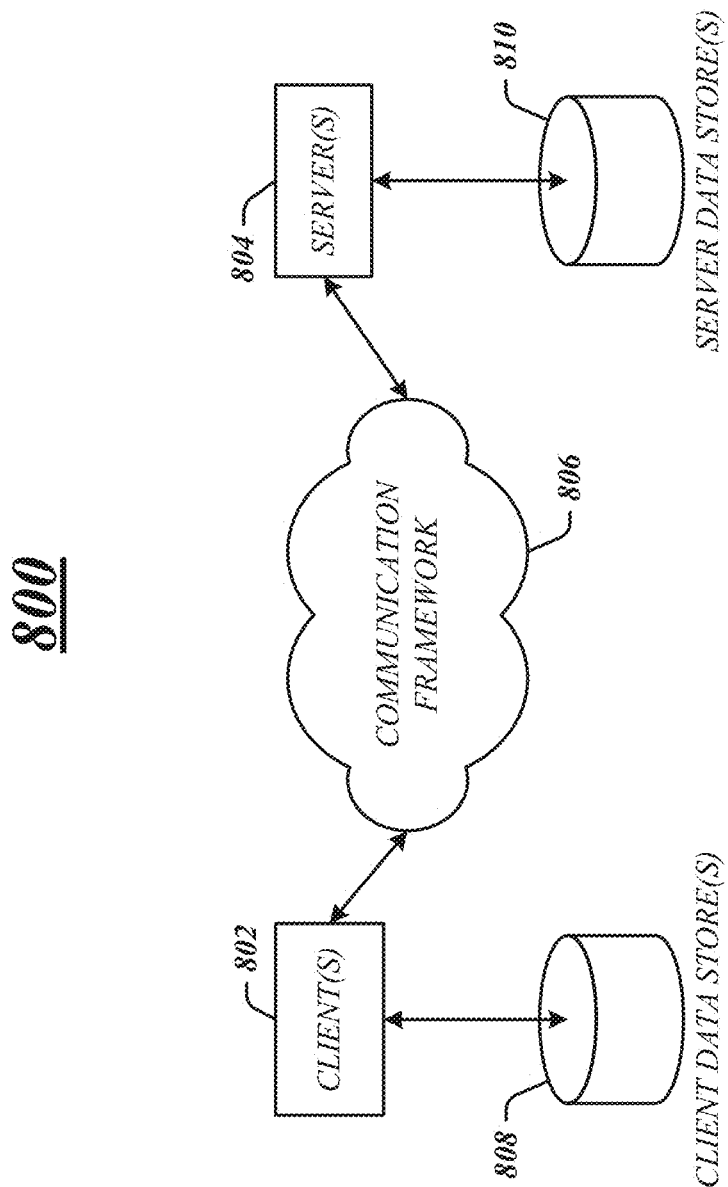
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 122. The servers 804 may implement the server systems for data service 110, 210, 310. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
generating a secret for a data center at a front end service comprising at least one server device;
receiving a request at the front end service to access a back end storage from a client device in the data center;
accessing the back end storage from the front end service using the secret generated for the data center without providing the secret to the client in the data center; and
returning a result of accessing the back end storage to the client.

2. The method of claim 1, wherein accessing the back end storage comprises executing a process on the back end storage.

3. The method of claim 1, wherein the received request does not include the secret.

4. The method of claim 1, wherein the secret comprises at least one of:
a user name;
a password;
a digital certificate; and
a private encryption key.

5. The method of claim 1, comprising storing the secret on the back end storage, wherein the secret is not accessible to the data center.

6. The method of claim 1, further comprising:
authenticating the request from the client at an identity system for the data center; and
validating the request.

7. The method of claim 1, further comprising:
monitoring the access from the front end service to the back end storage; and
generating an incident when the access is at least one of unauthorized or not validated.

8. The method of claim 7, comprising:
provisioning a new data center and generating a new secret for the new data center when an incident is generated.

9. An article comprising computer readable memory, the computer readable memory comprising instructions that when executed by a processor cause a system to:
generate a secret for a data center at a front end service;
store the secret on a back end storage not directly accessible to the data center;
receive a request at the front end service to access the back end storage from a client in the data center;
perform a validation process on the request;
access the back end storage from the front end service using the secret generated for the data center, when the request is validated and without providing the secret to the requesting client;
prevent access to data on the back end storage protected by the secret and generate a new secret for the data center, when the request is not validated; and
return a result of the validation process to the client.

10. The article of claim 9, the medium further comprising instructions that when executed cause the system to:
generate the secret for at least one of: a data center, a farm, an account, a set of access privileges, a role, and a business group, wherein the secret comprises at least one of: a user name; a password; a digital certificate; and a private encryption key.

11. The article of claim 9, the medium further comprising instructions that when executed cause the system to:
receive access credentials for the data center in the request; and
authenticate the data center using the access credentials by accessing an identity service of the data center.

12. The article of claim 11, wherein the secret is associated with an access privilege, the medium further comprising instructions that when executed cause the system to:

validate the request, when the data center is authenticated and when the request is for data or a service that is accessible to the data center according to the access privilege associated with the secret for the data center.

13. The article of claim 9, the medium further comprising instructions that when executed cause the system to:
prevent access to the secret and to data on the back end storage protected by the secret when the request is not validated; and
generate an incident in response to the request not being validated.

14. The article of claim 9, the medium further comprising instructions that when executed cause the system to:
monitor the access from the front end service to the back end storage; and
generate an incident when the access is at least one of unauthorized or not validated.

15. The article of claim 9, the medium further comprising instructions that when executed cause the system to:
access the secret that was generated for the data center; and
provide the secret to the back end storage with the request for access.

16. An apparatus, comprising:
a processor;
a front end service stored in memory and executing on the processor to:
receive, from a client device in a data center, a request to access at least one of data and a service on a back end storage, wherein the request does not contain a secret to access the back end storage;
prompt the back end storage to determine information identifying a secret generated for the data center; and
access the back end storage using the secret generated for the data center, when the request is validated, and without providing the secret to the client device; and
return a result of accessing the back end storage to the client.

17. The apparatus of claim 16, the front end service further to:
generate the secret for a data center; and
store the secret on the back end storage not directly accessible to the data center.

18. The apparatus of claim 16, the front end service further to:
authenticate the data center by accessing an identity service for the data center.

19. The apparatus of claim 16, wherein the secret is associated with an access privilege, the front end service further to:
validate the request by determining whether the request is for data or a service that is accessible to the data center according to the access privilege associated with the secret for the data center.

20. The apparatus of claim 16, the front end service further to:
monitor the access from the front end service to the back end storage; and
generate an incident when the access is at least one of unauthorized or not validated.

\* \* \* \* \*